B. F. STEBBINS & B. W. FOREHAND.
INSECT COLLECTING ATTACHMENT.
APPLICATION FILED NOV. 14, 1916.
1,243,888.
Patented Oct. 23, 1917.
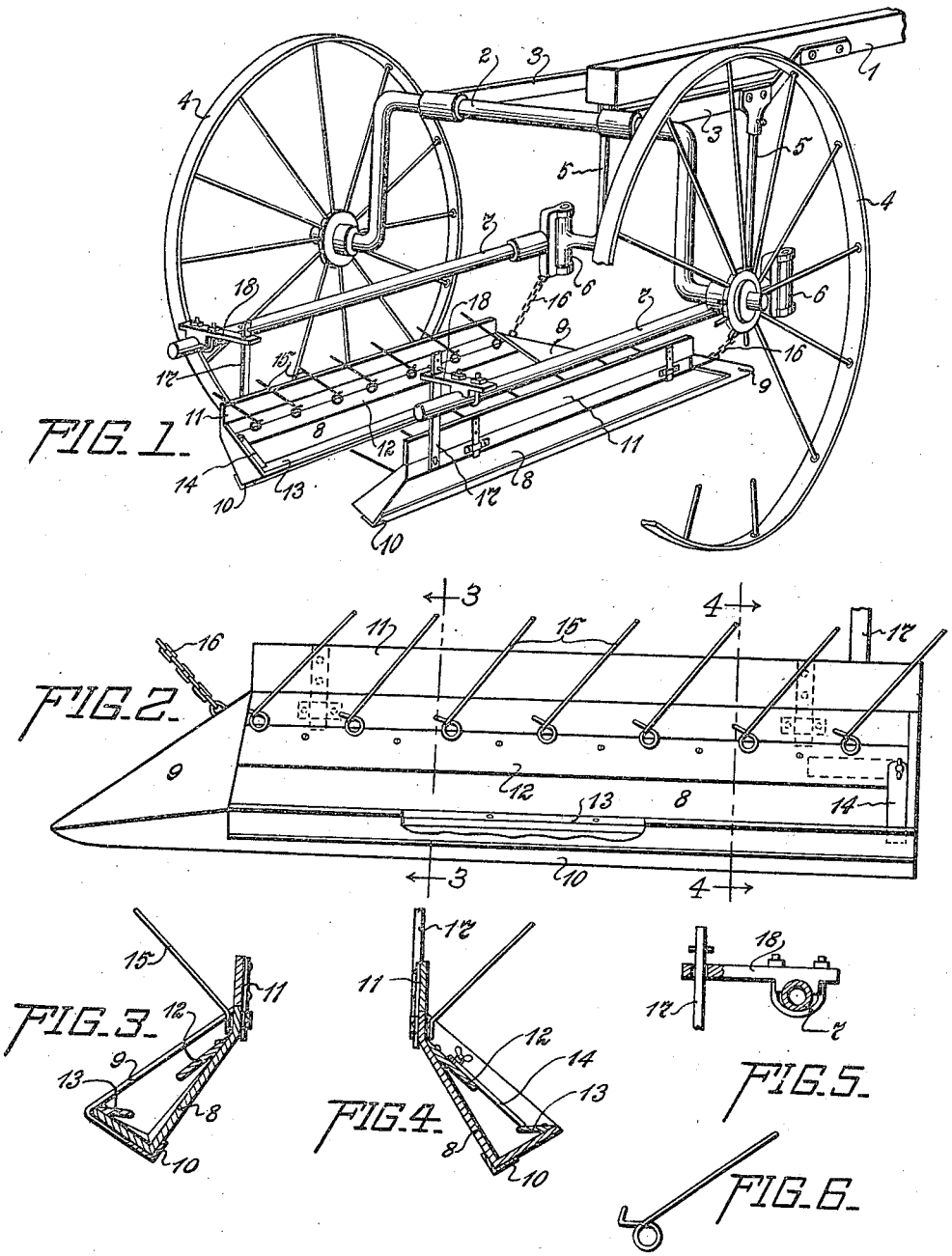
INVENTOR.
B.F. Stebbins
B.W. Forehand
BY
John M. Spellman
ATTORNEY.

UNITED STATES PATENT OFFICE.

BENJAMIN F. STEBBINS AND BLAKE W. FOREHAND, OF MULLIN, TEXAS.

INSECT-COLLECTING ATTACHMENT.

1,243,888.  Specification of Letters Patent.  Patented Oct. 23, 1917.

Application filed November 14, 1916. Serial No. 131,226.

*To all whom it may concern:*

Be it known that we, BENJAMIN F. STEBBINS and BLAKE W. FOREHAND, both citizens of the United States, residing at Mullin, in the county of Mills and State of Texas, have invented certain new and useful Improvements in Insect-Collecting Attachments, of which the following is a specification.

Our invention has relation to an improvement in means for collecting and removing boll weevils and similar insects or parasites from field plants and in such connection it relates more particularly to an attachment for cultivators or similar agricultural implements, designed to shake loose the insects from the plant and to collect said insects for removal and destruction.

In plants, such for instance as the cotton plant, infected with bugs or parasitical insects difficulty has been heretofore met in the removal and destruction of the insects. Such plants cannot be readily sprayed and hand removal of the insects has been laborious and ineffectual.

It is the main object of our invention to provide an attachment for cultivators or similar implements which when supported to position and moving with the implement will agitate or shake the stems of the plants and thus dislodge the insects from the leaves and branches of the plants. The attachment further comprises a trough or receptacle for the collection of the insects thus dislodged. The attachment may be readily secured to or removed from the pole or tongue of the implement and depends by vertically yielding connections from swinging supports carried by said pole or tongue.

The nature and scope of our invention will be more fully understood from the following description taken in connection with the accompanying drawings forming part hereof, in which—

Figure 1, is a perspective view of an attachment embodying the main features of our invention and in operative connection with the frame of a cultivator.

Fig. 2, is a side elevational view of the attachment.

Figs. 3 and 4 are cross sectional views taken respectively on lines 3—3 and 4—4 of Fig. 2.

Fig. 5, is a detail sectional view of the connection between the rear end of the attachment and the swinging support for said attachment, and Fig. 6, is a detail view of one of the spring fingers of the attachment.

Referring to the drawings 1 represents the pole or tongue of a cultivator and 2 the axle connected to said tongue by the side braces 3. The wheels 4 turn loosely on the ends of said axle. Each side brace 3 rigidly supports an arm 5 having a pintle or swivel connection 6 at its lower end upon each of which the horizontally arranged arms 7 is adapted to swing.

The attachment proper comprises a trough-like receptacle 8 having a pointed end 9 shod with metal and arranged to travel on the ground adjacent to the plant stalks. The base of the trough 8 is also shod with metal as at 10 along the edge on which the trough rides as it is drawn over the ground.

The trough 8 is supported at an angle from the upright side board 11, the trough projecting downwardly and inwardly as clearly shown in Fig. 3. In the interior of the trough along its upper edge is arranged a metal shield 12 to prevent escape of insects from the trough to and over the side board 11 and a similar shield 13 is arranged along the lower edge of the trough to prevent the escape of insects over this lower edge to the ground. A revoluble plate 14 at the rear of the trough and extending from shield 12 to shield 13 prevents the insects dropping out of the attachment as the same is dragged over the ground. When the collected insects are to be removed for destruction this plate or gate 14 is turned to the position indicated in dotted lines in Fig. 2 and the insects are dumped at the rear end of the trough.

Along the upper side edge of the trough are arranged a series of spring fingers 15 projecting upwardly, inwardly and to the rear of the attachment. These fingers are adapted, as the attachment moves over the ground, to strike upon the leaves and branches of the plant to dislodge the insects which then drop into trough 8.

To permit the trough 8 to slide or ride over the inequalities of the road, it is attached to one of the swinging horizontal arms 7 by a yielding connection which will permit the attachment to move vertically independently of the arm 7 and yet will follow that arm in its swinging movement upon pintle or swivel mechanism 6. In its simplest form this yielding connection consists of a chain 16 connecting the forward pointed end of the attachment to the arm 7, and a vertically disposed bar 17 rigidly secured to the rear end of the attachment and riding up and down in a slotted bracket 18 rigidly secured to the rear end of said arm 7.

As shown in the drawings there are usually a pair of the attachments each traveling along either side of the row of plants and each attachment is yieldingly supported from one of the horizontal swinging arms 7.

Inasmuch as the plants are not usually arranged in straight rows but are planted more or less irregularly, the arms 7 are permitted to swing horizontally over the ground so that the attachments depending from said arms may swing toward the stems of the plants and thus follow the irregularities in the row.

Having thus described the nature and objects of our invention, what we claim as new and desire to secure by Letters Patent, is—

In a device of the character described, a trough-like receptacle arranged to slide on the ground, a side board for said trough and spring fingers secured to said board and projecting upwardly, inwardly and rearwardly of the receptacle, combined with an arm arranged to swing horizontally over the ground, a vertically yielding connection between said arm and one end of the receptacle, and a flexible connection between said arm and the other end of the receptacle.

In testimony whereof we have signed our names to this specification.

BENJAMIN F. STEBBINS.
BLAKE W. FOREHAND.

Copies of this patent may be obtained for five cents each, by addressing the "Commissioner of Patents, Washington, D. C."